United States Patent [19]

Boyle et al.

[11] Patent Number: 4,637,914

[45] Date of Patent: Jan. 20, 1987

[54] QUICK RELEASE GUIDE SLEEVE ASSEMBLY

[75] Inventors: David E. Boyle, Kiski; James R. Chrise, Trafford, both of Pa.

[73] Assignee: Westinghouse Electric Corp., Pittsburgh, Pa.

[21] Appl. No.: 574,839

[22] Filed: Jan. 30, 1984

[51] Int. Cl.⁴ .................... G21C 7/00; F16B 9/00
[52] U.S. Cl. ...................... 376/353; 376/352; 376/260; 376/463; 403/194; 403/325
[58] Field of Search ........... 376/353, 352, 243, 292, 376/377, 389, 399, 233, 235, 364, 463, 446, 260; 403/325, 322, 238, 239, 196, 194

[56] References Cited

U.S. PATENT DOCUMENTS

| | | | |
|---|---|---|---|
| 2,297,548 | 9/1942 | Fox et al. | 285/316 X |
| 2,548,528 | 4/1951 | Hansen | 285/316 X |
| 3,172,819 | 3/1965 | Picton | 376/352 |
| 3,174,508 | 3/1965 | Zahurance | 285/277 X |
| 4,134,789 | 1/1979 | Aubert | 376/233 X |
| 4,174,257 | 11/1979 | Calvin | 376/365 |
| 4,289,291 | 9/1981 | Goddard | 376/352 X |
| 4,498,658 | 2/1985 | Mikiya | 285/316 X |

FOREIGN PATENT DOCUMENTS

| | | | |
|---|---|---|---|
| 1061452 | 7/1959 | Fed. Rep. of Germany | 376/364 |
| 1213932 | 4/1966 | Fed. Rep. of Germany | 376/292 |
| 0046308 | 6/1966 | Fed. Rep. of Germany | 376/364 |
| 1268775 | 6/1961 | France | 376/364 |
| 0175064 | 4/1961 | Sweden | 403/325 |
| 1159971 | 7/1969 | United Kingdom | 376/449 |

Primary Examiner—Deborah L. Kyle
Assistant Examiner—Dan Wasil
Attorney, Agent, or Firm—Daniel L. Abeles

[57] ABSTRACT

A quick release guide sleeve assembly comprises an outer sleeve, an inner sleeve axially slidably received in the outer sleeve and having first and second axial positions with respect to the outer sleeve; and a locking mechanism movably mounted on the outer sleeve for frictionally engaging wall surfaces defining an opening for receiving the outer sleeve. The locking mechanism has a locking position in which at least part of the locking mechanism projects radially outwardly beyond the external circumferential surface of the outer sleeve. The locking mechanism further has a releasing position in which the locking mechanism is in a radially inwardly withdrawn state relative to the circumferential surface of the outer sleeve. The assembly further includes a camming arrangement carried on the inner sleeve for pressing the locking mechanism into the locking position when the inner sleeve is in the first axial position and for allowing the locking mechanism to assume the releasing position when the inner sleeve is in the second axial position. A spring urges the inner sleeve continuously into the first axial position.

8 Claims, 5 Drawing Figures

QUICK RELEASE GUIDE SLEEVE ASSEMBLY

BACKGROUND OF THE INVENTION

1. Field of the Invention

This invention relates to a guide assembly, particularly for service in a nuclear reactor of the pressurized water type. The guide assembly functions as a flow restrictor for the primary water circuit passing through the reactor and as a guide for guiding a drive shaft connected to control rods.

2. Description of the Prior Art

In pressurized water reactors, for restricting (throttling) the flow of water in the primary circuit and for guiding the control rod drive shaft, a particular, dual-purpose guide assembly is used which is mounted in a top plate supported in a control rod guide tube in the zone of the reactor head plenum. Conventionally, the guide assembly comprise a grommet-like member which is fitted into a throughgoing aperture provided in the top plate. The grommet-like member is firmly held in the aperture by a plurality of flexure elements oriented parallel to the guide tube length and arranged circumferentially about the throughgoing aperture. The flexure elements are mounted in special fittings supported in the top plate.

The above-outlined conventional guide assembly requires machining and welding operations for installing the flexure members in the top plate and further, if the flexure elements need replacement, for example, because of stress corrosion, a time consuming assembly work is required which involves relatively long down times of the reactor.

SUMMARY OF THE INVENTION

It is an object of the invention to provide a quick release guide sleeve assembly which may be simply and rapidly installed and removed and which, in use with control rod drive shafts in pressurized water reactors, eliminates the conventionally required flexure elements and needs no machining and welding work for installation.

This object and others to become apparent as the specification progresses, are accomplished by the invention, according to which, briefly stated, the quick release guide sleeve assembly comprises an outer sleeve, an inner sleeve axially slidably received in the outer sleeve and having first and second axial positions with respect to the outer sleeve; and a locking mechanism movably mounted on the outer sleeve for frictionally engaging wall surfaces defining an opening for receiving the outer sleeve. The locking mechanism has a locking position in which at least part of the locking mechanism projects radially outwardly beyond the external circumferential surface of the outer sleeve. The locking mechanism further has a releasing position in which the locking mechanism is in a radially inwardly withdrawn state relative to the circumferential surface of the outer sleeve. The assembly further includes a camming arrangement carried on the inner sleeve for pressing the locking mechanism into the locking position when the inner sleeve is in the first axial position and for allowing the locking mechanism to assume the releasing position when the inner sleeve is in the second axial position. A spring urges the inner sleeve continuously into the first axial position.

DESCRIPTION OF THE PREFERRED EMBODIMENTS

Figure 1:
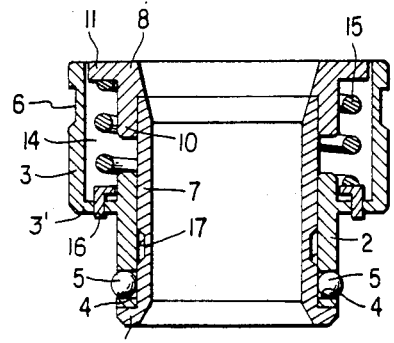
FIG. 1 is an axial sectional view of a preferred embodiment of the invention, shown in a locking state.
Figure 2:
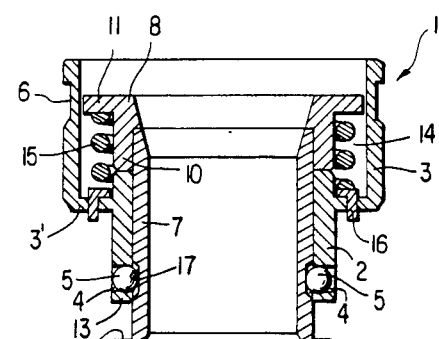
FIG. 2 is an axial sectional view of the same embodiment, shown in a releasing state.

Turning to FIGS. 1 and 2, a preferred embodiment of the quick release guide sleeve assembly according to the invention generally indicated at 1 is shown in a locking state (FIG. 1) and a releasing state (FIG. 2).

The sleeve assembly 1 comprises an outer sleeve 2 having, at one axial end, a bowl-shaped cylindrical enlargement 3 which joins the outer sleeve 2 with the intermediary of a radial shoulder 3'. The outer sleeve 2 is, adjacent an end remote from the cylindrical enlargement 3, provided with a plurality of circumferentially distributed radial nest ports 4 each accommodating a locking ball 5, radially movable within the respective nest port 4. Each nest port 4 has a radially outer opening of smaller diameter than the locking balls 5 to prevent the locking balls 5 from dropping out of the sleeve assembly in a non-installed state thereof but, at the same time, allowing a projection of the locking balls 5 beyond the outer cylindrical surface of the outer sleeve 2. The cylindrical enlargement 3 of the outer sleeve 2 has, on its outer face, a circumferential groove 6 for engagement by a tool as will be described later.

Concentrically within the outer sleeve 2 and its cylindrical enlargement 3 there is axially slidably arranged an inner sleeve 7 having, at opposite axial ends, respective flange rings 8 and 9. The flange ring 8 has a tubular part 10 whose diametrical dimensions generally correspond to those of the inner sleeve 2 and a radially outwardly extending flange part or radial shoulder 11 which terminates at a small clearance from the inner wall of the cylindrical enlargement 3. The radial shoulder face 12 of the flange ring 9 is generally in alignment with the terminal radial edge face 13 of the outer sleeve 2.

In an annular chamber 14 bounded by the inner surface of the cylindrical enlargement 3, the outer surface of the tubular part 10 and the radial shoulders 3' and 11 there is accommodated a compression coil spring 15 engaging, at one end, the radial shoulder 11 and, at the other end, an axially movable spring seat ring 16 projecting axially outwardly from the radial shoulder 3'. The spring 15 is arranged in the chamber 14 in a compressed condition so that it continuously urges the inner sleeve 7 outwardly from the outer sleeve 2. An abutting cooperation between the radial shoulder faces 12 and 13 limits the outward displacement of the inner sleeve 7 with respect to the outer sleeve 2.

The inner sleeve 7 is provided on its outer cylindrical face with a circumferential groove 17 which, in the locking state of the sleeve assembly shown in FIG. 1, is out of alignment with the radial nest ports 4 and thus the latter are covered by an outer cylindrical wall portion of the inner sleeve 7. As a result, the locking balls 5 whose diameter is greater than the wall thickness of the outer sleeve 2, project radially beyond the outer cylindrical face thereof as shown in FIG. 1.

Upon exerting an external axial force on the inner sleeve 7 (for example, by pressing axially on the flange ring 8), the latter may be axially displaced inwardly relative to the outer sleeve 2 against the axial force of the coil spring 15 to assume a compressed position as illustrated in FIG. 2. In the maximum compressed position shown therein, which is defined by the abutting relationship between an upper radial edge face of the outer sleeve 2 and a lower radial edge face of the tubular part 10 of the flange ring 8, the circumferential groove 17 is brought into alignment with the radial nest ports 4 thus allowing the locking balls 5 to move radially inwardly to be received, in part, in the circumferential groove 17. In this condition, the locking balls 5 are entirely withdrawn with respect to the outer cylindrical face of the outer sleeve 2.

Figure 3:
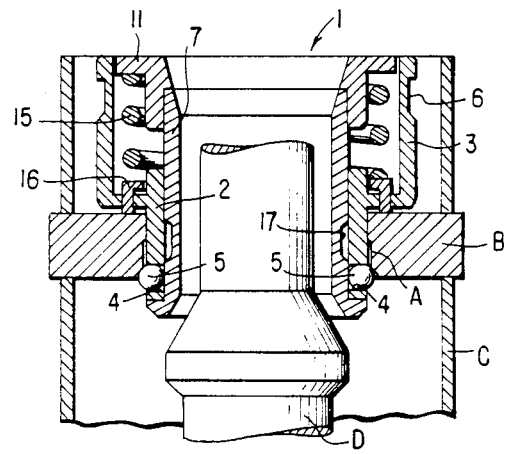
FIG. 3 is an axial sectional view of the same embodiment, shown in an installed, locking state.

In the description which follows the insertion and removal of the quick release guide sleeve assembly 1 will be described, with particular reference to FIG. 3, in conjunction with its use as a flow restrictor and axial guide for a control rod drive shaft in a nuclear reactor of the pressurized water type.

To install the sleeve assembly, a rod-like mounting tool (not shown) is used which has a terminal portion that engages, for example, with claws or a radially inwardly oriented rim, into the circumferential groove 6 of the cylindrical enlargement 3 and presses down, for example with a plunger, on the upper radial face of the flange part 11 to move the inner sleeve 7 into a position shown in FIG. 2. Thereafter, the sleeve assembly 1 is advanced by the mounting tool axially downwardly into the upper head plenum of the nuclear reactor and the sleeve assembly 1 is inserted from above into an aperture A of a horizontally oriented top plate B held in a vertically extending upper guide tube C situated in the upper head plenum of the reactor.

Upon continued downward movement of the mounting tool and the sleeve assembly 1, first and lower radial face of the spring seat ring 16 engages the upper face of the top plate B. Thereafter, the upwardly oriented reaction force exerted by the upper face of the top plate B forces the spring seat ring 16 upwardly against the force of the coil spring 15 further into the annular chamber 14 until the radial underface of the shoulder 3' arrives into a face-to-face contact with the upper face of the top plate B. Then the inserting tool is withdrawn upwardly, thus removing the downwardly oriented force from the radial shoulder 11 of the flange ring 8. As a result, the coil spring 15 causes a relative movement between the outer sleeve 2 and the seat ring 16, whereby the outer sleeve 2 is slightly lifted off the upper face of the top plate B while the lower radial face of the spring seat ring 16 remains in engagement with the upper face of the top plate B as shown in FIG. 3. Also as a result of the removal of the downwardly oriented force from the radial shoulder 11 of the flange ring 8, the coil spring 15 displaces the inner sleeve 7 upwardly with respect to the outer sleeve 2 whereby the circumferential groove 17 moves out of alignment with the nest ports 4 and thus by camming effect of a sloped side wall of the groove 17, the locking balls 5 are forced radially outwardly into frictional engagement with inner wall portions defining the opening A in the top plate B. Such a locking engagement immobilizes the sleeve assembly 1 in the opening of the top plate B as shown in FIG. 3. Preferably, the lower circumferential edge zone of the opening A is beveled, whereby a downwardly oriented force component is generated at the location of contact between the radially outwardly forced locking balls 5 and the beveled part of the edge zone of the opening A. The downwardly oriented force component continuously presses the outer sleeve 2 in the downward direction. It will be appreciated that the radial clamping force exerted by the locking balls 5 depends, among others, from the force applied by the spring 15 and the camming angle between locking ball 5 and the sloped side wall of the groove 17 and the dimetral relationships between locking ball 5, inner sleeve 7 and opening A. It is further noted that since the outer sleeve 2 is supported (stabilized) on the upper face of the plate B by engagement with the axially resiliently yielding spring seat ring 16 rather than by engagement with the radial underface of the shoulder 3', there is no need for narrow surface tolerances for a firm engagement of the assembly with the upper face of the plate B.

After reinstalling the control rod drive shaft D, the latter axially passes through the sleeve assembly 1 and defines an annular flow channel with the inner cylindrical face of the inner sleeve 7. The inner cylindrical face of the inner sleeve 7 thus functions as flow restrictor and, in addition, serves as an axial guide for the control rod drive shaft D, limiting radial excursions thereof.

The removal of the quick release sleeve assembly 1 occurs in a reverse order: the installing and removing tool (not shown) is lowered in alignment with the sleeve assembly 1 to engage the outer circumferential groove 6 of the cylindrical enlargement 3 and to press down on the flange ring 8, causing an axial downward shift of the inner sleeve 7. As the circumferential groove 17 assumes its aligned position with respect to the nest ports 4, the sleeve assembly 1 may be pulled by the tool freely upwardly out of the opening A, since the locking balls 5 will readily yield to radially inwardly directed external forces and will be accommodated along outer spherical parts thereof in the circumferential groove 17.

Figure 4:
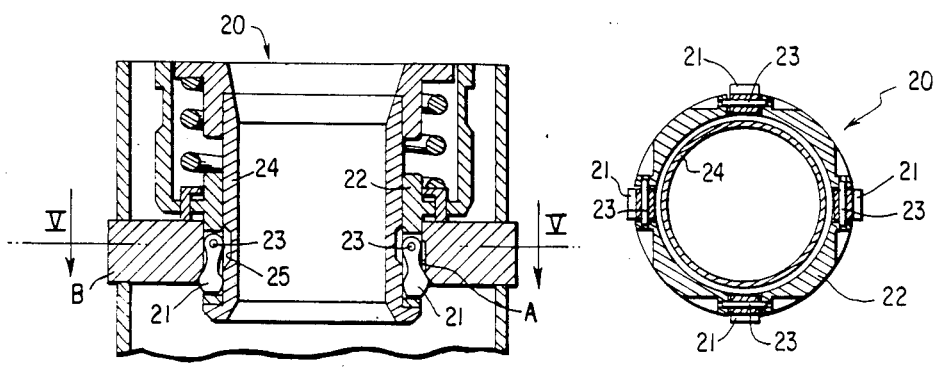
FIG. 4 is an axial sectional view of another preferred embodiment, shown in an installed, locking state.
Figure 5:
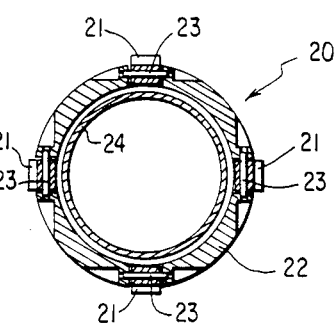
FIG. 5 is a sectional view taken along line V—V of FIG. 4.

FIGS. 4 and 5 illustrate another preferred embodiment of the invention. The guide sleeve assembly generally designated at 20 shown in FIGS. 4 and 5 differs from the guide sleeve assembly 1 in that instead of locking balls, locking sprags 21 are provided which are pivotally secured to the outer cylindrical surface of outer sleeve 22 of the guide sleeve assembly 20 by means of respective pins 23. Each sprag 21 has a radially outwardly oriented part which is adapted to frictionally engage the inner walls of an opening, such as opening A of the top plate B as well as a radially inwardly oriented part which, in the normal operative position of the assembly as shown in FIG. 4, is pressed outwardly by the outer cylindrical face of the inner sleeve 24 of the guide sleeve assembly 20. In the compressed (releasing) state of the sleeve assembly 20 the radially inwardly oriented parts of the sprags 21 are accommodated in the circumferential groove 25 which is provided in the inner sleeve 24 and which is then in an axial position to receive the sprag parts.

The installation and removal of the quick release guide sleeve 20 is effected in a manner identical to that described in connection with the quick release guide sleeve assembly 1.

It is seen that, in contradistinction to prior art flow restrictors in nuclear reactors as outlined earlier, the guide sleeve assembly according to the invention is clamped directly to the inner wall proper of the aperture provided in the top plate and thus no other securing means, such as flexure elements mounted on the top plate are needed.

It will be understood that the above description of the present invention is susceptible to various modifications, changes and adaptations, and the same are intended to be comprehended within the meaning and range of equivalents of the appended claims.

We claim:

1. A quick release guide sleeve assembly, comprising:
   (a) an outer sleeve having an external circumferential surface and a cylindrical enlargement including a radial shoulder;
   (b) an inner sleeve axially slidably received in said outer sleeve and having first and second axial positions with respect to said outer sleeve;
   (c) locking means movably mounted on said outer sleeve for frictionally engaging wall surfaces defining an opening for receiving the outer sleeve; said locking means having a locking position in which at least part of said locking means projects radially outwardly beyond said external circumferential surface of said outer sleeve; said locking means having a releasing position in which said locking means is in a radially inwardly withdrawn state relative to said circumferential surface of said outer sleeve;
   (d) camming means carried on said inner sleeve for pressing said locking means into said locking position in said first axial position of said inner sleeve and for allowing said locking means to assume said releasing position in said second axial position of said inner sleeve;
   (e) spring means for urging said inner sleeve continuously into said first axial position; and
   (f) a spring seat ring axially movably positioned adjacent said radial shoulder of said cylindrical enlargement and having portions projecting axially outwardly from said radial shoulder of said cylindrical enlargement in a direction away from said spring means; said spring means being in engagement with, and exerting an axial force, on said spring seat ring.

2. A quick release guide sleeve assembly as defined in claim 1, further comprising a plurality of circumferentially distributed nest ports passing radially through said outer sleeve; said locking means comprising a plurality of locking balls radially movably received in said nest ports; portions of said locking balls projecting radially outwardly beyond said outer circumferential surface of said outer sleeve in said locking position.

3. A quick release guide sleeve assembly as defined in claim 2, wherein said outer sleeve has an inner circumferential surface and said inner sleeve has an outer circumferential surface being in axially sliding engagement with said inner circumferential surface; further wherein said camming means comprises means defining a circumferential groove in said outer circumferential surface of said inner sleeve; in said first axial position of said inner sleeve said circumferential groove being out of alignment with said locking balls and said outer circumferential surface pressing said locking balls radially outwardly in said locking position thereof; and in said second axial position of said inner sleeve said circumferential groove being in alignment with said locking balls for receiving portions of said locking balls in said releasing position thereof.

4. A quick release guide sleeve assembly as defined in claim 1, wherein said inner sleeve has, at an axial end, a flange ring surrounded by said cylindrical enlargement and including a radial shoulder; and further wherein said spring means comprises a coil spring surrounded by said cylindrical enlargement and arranged about said inner sleeve coaxially therewith, said coil spring being in engagement with, and exerting an axial force on, said radial shoulder of said flange ring for urging said inner sleeve into said first axial position.

5. A quick release guide sleeve assembly as defined in claim 4, further wherein said spring seat ring is coaxial with said coil spring.

6. A quick release guide sleeve assembly as defined in claim 1 in combination with a guide tube for a control rod drive shaft forming components of a pressurized water reactor; said guide tube supporting a plate disposed within said guide tube generally perpendicularly to a length dimension of said guide tube; said plate including said opening; said outer sleeve being received in said opening and being held therein by engagement between said wall surfaces and said locking means; said portions of said spring seat ring projecting axially outwardly from said radial shoulder being in engagement with said plate; said inner sleeve having an inner circumferential surface forming a flow passage for water in a water circuit; said control rod drive shaft passing longitudinally through said guide tube and said inner sleeve.

7. A quick release guide sleeve assembly as defined in claim 1 wherein said locking means comprises a plurality of locking sprags pivotally mounted on said outer sleeve in a circumferentially distributed relationship for frictionally engaging said wall surfaces in said locking position.

8. A quick release guide sleeve assembly as defined in claim 6 wherein said locking means comprises a plurality of locking sprags pivotally mounted on said outer sleeve in a circumferentially distributed relationship for frictionally engaging said wall surfaces in said locking position.

* * * * *